Oct. 23, 1923.  
H. A. CARSON  
POWER TRANSMISSION  
Filed March 7, 1921  
1,471,589  
5 Sheets-Sheet 1

Oct. 23, 1923.

H. A. CARSON

1,471,589

POWER TRANSMISSION

Filed March 7, 1921

Witness:

R. E. Hamilton

Inventor:
Henry A. Carson,
By
Thorpe & Enard
Attorneys.

Oct. 23, 1923.

H. A. CARSON

1,471,589

POWER TRANSMISSION

Filed March 7, 1921

Patented Oct. 23, 1923.

1,471,589

UNITED STATES PATENT OFFICE.

HENRY A. CARSON, OF ST. JOSEPH, MISSOURI.

POWER TRANSMISSION.

Application filed March 7, 1921. Serial No. 450,323.

*To all whom it may concern:*

Be it known that I, HENRY A. CARSON, citizen of the United States, and resident of St. Joseph, county of Buchanan, State of Missouri, have invented a certain new and useful Improvement in Power Transmission, of which the following is a complete specification.

The present invention relates to power transmission mechanism, and aims to provide an improved form of transmission adapted for use in any relation requiring the transmission of power from a driving member or shaft to a driven part, and particularly adapted for use as a transmission for automobiles, tracks, tractors and the like.

One of the special objects of the invention is to devise a transmission of the character indicated, in which provision is made for convenient disconnection or interruption of the drive, as well as for reversing the direction of drive as may be required, and for so constructing the clutch elements of the transmission as to permit free acceleration of the driven part and its load above the rate of movement of the drive member or shaft.

In carrying out the invention in practice, I provide a transmission in which the driven member includes a rotating fly wheel adapted to be rotated by the action of a set of clutch elements having an intermittent engagement with said fly wheel in response to an intermittent movement imparted to said elements through the medium of connections from the driving shaft, the arrangement and operation of said clutch elements being such as to permit the fly wheel to accelerate beyond the speed of the driving shaft in the event that the movement of the load has become accelerated beyond the speed of the drive.

A further feature of the improved transmission resides in a novel brake feature, which takes the form of a brake member associated with the driven part, and provided with a brake releasing connection for applying the brake which is operated automatically whenever the drive through the transmission mechanism is interrupted, as either in disconnecting the same or reversing the direction of drive.

With the foregoing general objects in view the invention will now be described by reference to the accompanying drawings illustrating one form of construction which I have devised for embodying the proposed improvements after which the novel features therein will be particularly set forth and claimed.

Figure 1:
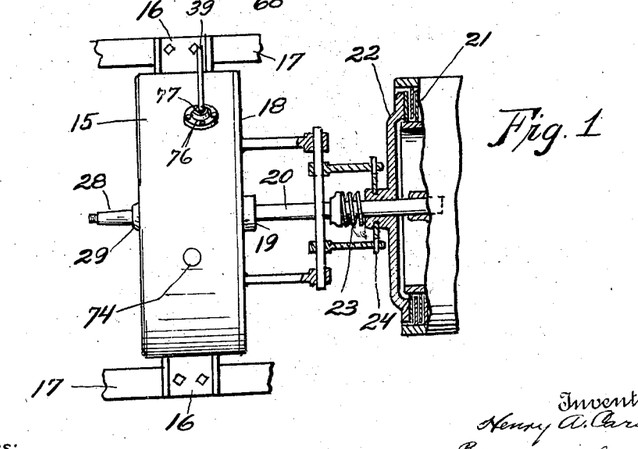
Figure 1 is a plan view, partly broken away, showing a transmission mechanism constructed in accordance with the present invention, and in relation to the clutch and drive shaft of an automobile drive construction.

Referring now to the drawings in detail, this illustrates the improved transmission comprising a housing 15 having suitable laterally projecting lugs 16 for supporting the transmission upon a framework, such as the chassis 17 of a truck or auto frame, the face plate 18 of which housing is formed with a bearing 19 for journaling one end of a drive shaft 20 in alinement with the engine shaft (not shown) from which the power is to be transmitted, as through the medium of any suitable form of clutch 21 including a clutch disk 22 slidingly mounted upon the shaft 20 as shown in Figure 1. The clutch disk 22 is adapted to be maintained normally clutched by the action of a coil spring 23, and to be retracted against the action of said spring through the medium of any appropriate operating connection (not shown) from the driver's position and including the usual yoke collar 24 connecting with the hub of the disk 22.

Figures 4, 6, 7:
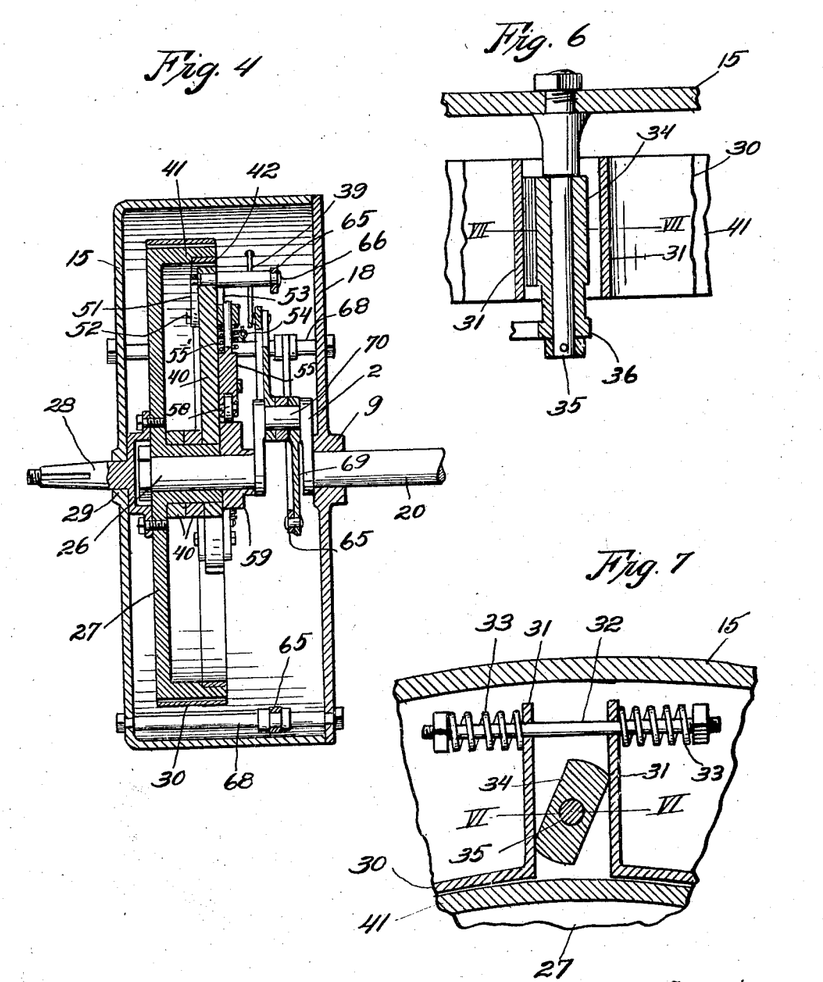
Figure 4 is a horizontal central section through the transmission.
Figure 6 is an enlarged sectional detail view, representing a section taken on the line VI—VI of Figure 7, and showing the brake operating connection.
Figure 7 is a similar view, illustrating a section taken on the line VII—VII of Figure 6.

Within the housing 15 the shaft 20 is provided with a crank portion 25 adjacent the face plate 18, and terminates in an axial extension 26 upon which is journaled a fly wheel or driven member 27, as clearly shown in Figure 4. To the rear face of said wheel 27 is attached the inner end of a stub shaft 28 journaled in a bearing 29 formed upon the rear face of the housing 15, to which stub shaft 28 is attached the shaft which is to be driven, in the usual manner. To the periphery of this wheel 27 is also applied a brake band 30 encircling said wheel and having outturned terminals 31 for accommodating a pin or bolt 32 carrying on its opposite ends a pair of expansion springs 33 cooperating normally to clamp or apply the band 30 to the face of the wheel 27 and thereby exert a braking action thereon. The action of the brake is controlled by means of a block 34 mounted between the terminals 31 upon a pivot pin 35 supported from the rear face of the housing 15, the block 34 having a sleeve extension 36 to which is attached a lever or operating arm 37, the inner end of which is forked for engagement by a pair of collars 38 upon the control rod 39 provided for the controlling operation of the transmission mechanism, as hereinafter described.

Figures 2, 13, 14:
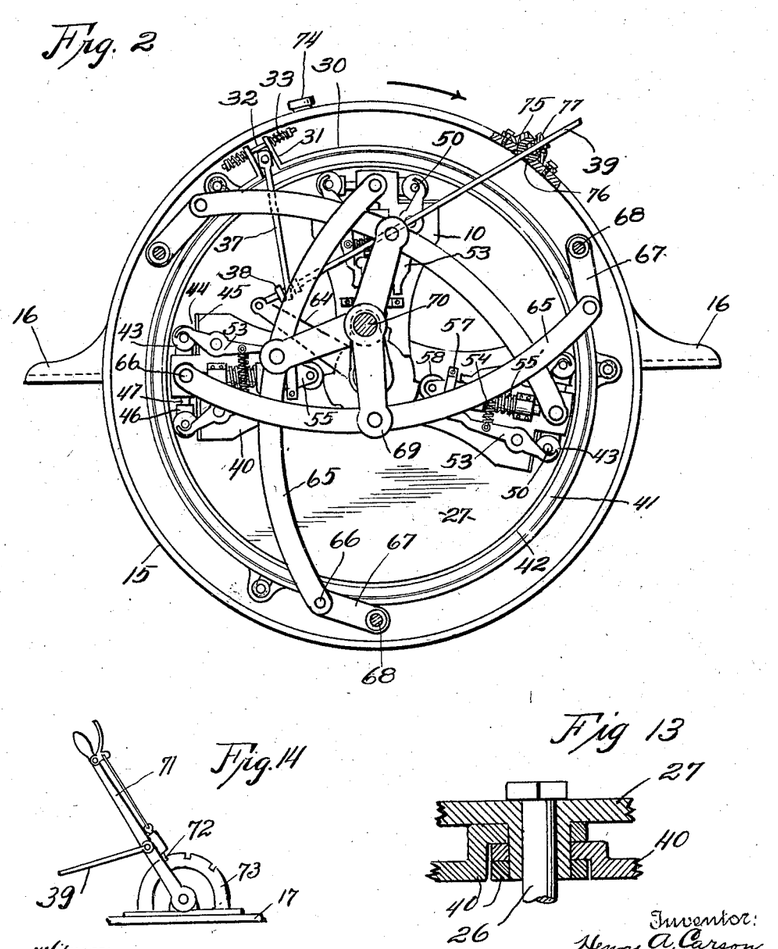
Figure 2 is a front elevation on an enlarged scale, showing the interior of the transmission, certain of the parts being shown in section.
Figure 13 is a detail section, taken on the line XIII—XIII of Figure 11.
Figure 14 is an elevation showing the control lever and its operating connection to the transmission.
Figures 8, 9:
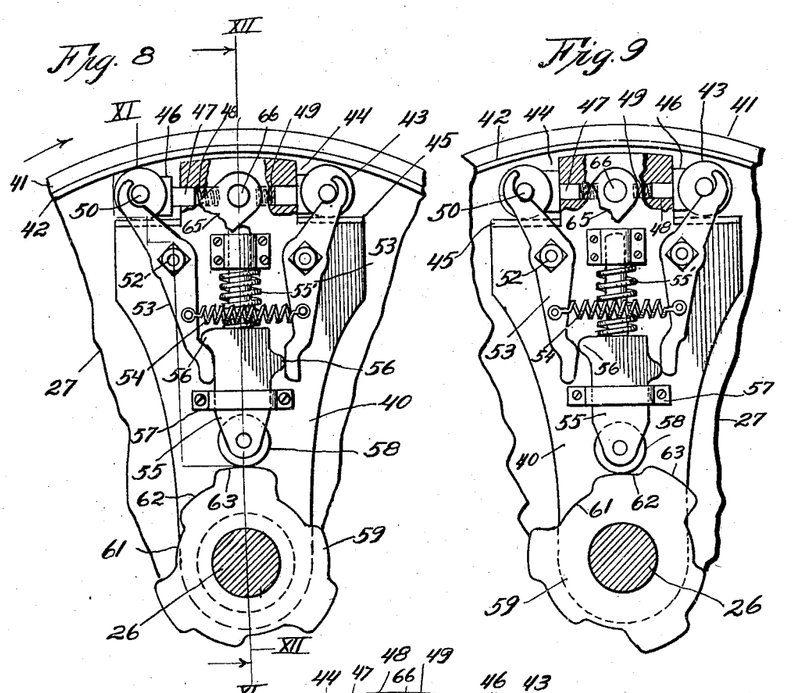
Figures 8, 9 and 10 are enlarged detail views, illustrating one of the oscillating arms with its clutch elements for gripping the flange of the fly wheel, and showing said elements in forward drive, neutral and reverse drive positions, respectively.
Figure 10:
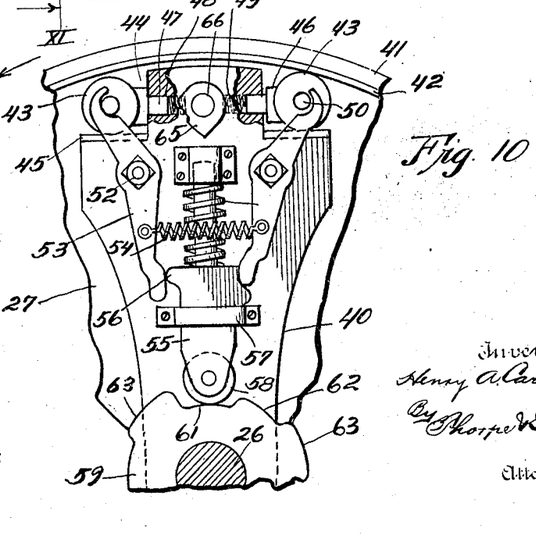
Figure 11:
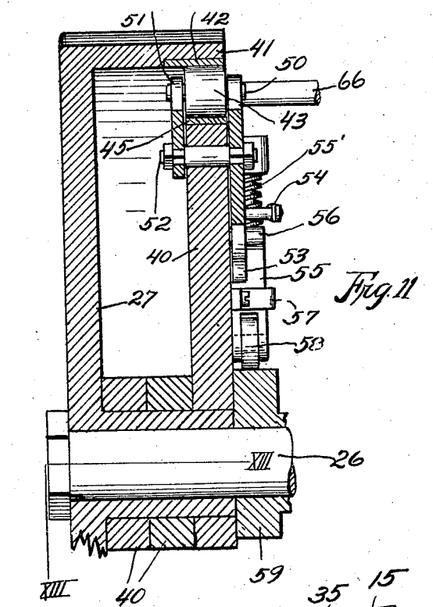
Figures 11 and 12 are sections taken on the lines XI—XI and XII—XII, respectively, of Figure 8.
Figure 12:
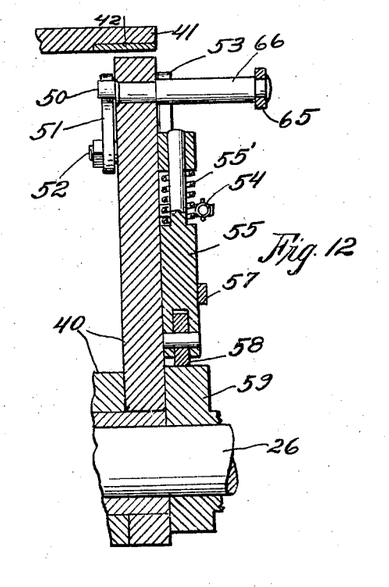

Upon the interior hub portion of the driven wheel 27 is mounted a plurality of oscillating clutch arms 40 projecting in different radial directions from the axis of the shaft 20 for exerting a clutching action upon different portions of the forwardly projecting flange 41 formed upon the periphery of the wheel 27. The inner ends of the arms 40 are journaled side by side upon said hub portion of the wheel 27, the rearmost and intermediate arms being bent forwardly sufficiently to bring their free or outer ends into the same plane, as illustrated in Figures 4, 11 and 13. The inner face of the flange 41, at the rear edge thereof, is provided with an annular recess for accommodating a clutch ring 42 of hardened steel, for clutching engagement by a set of steel clutch rollers 43, of which a pair is provided for each of the clutch arms 40. The outer end of each of the clutch arms 40 is formed with a pair of oppositely facing recesses 44 for accommodating the corresponding pair of clutch rollers 43, the base of each recess being lined with a suitable plate 45 of hardened steel extending at right angles to the radius of the corresponding arm 40. With this arrangement it is apparent that each roller is adapted to effect clutching engagement between its arm 40 and the steel ring 42 whenever such roller is allowed to become gripped between its plate 45 and said ring, which is the case whenever the roller occupies a position toward the outer edge of said plate 45. Each roller 43 is provided with a follower block 46 formed with a stem 47 fitting within a recess 48 in the arm 40, each recess 48 also being fitted with a coil spring 49 whereby the follower is actuated to project the corresponding roller 43 normally into clutching position. One of the trunnions 50 of each roller 43 is engaged by rocker arm secured to the rear end of a rocker shaft 52 carried by the arm 40, the other end of each pin 52 having secured thereto a lever 53 formed with a recessed upper end for engagement with the other trunnion of the corresponding roller 43. At their inner ends each pair of levers 53 is connected by a coil contractile spring 54, the action of which serves to swing the levers 53 in the proper directions for releasing the clutch rollers to the action of their springs 49, and hence into clutched relation with the ring 42. Referring to Figures 8 to 10, it will be noted that each arm 40 is provided with a cam plate 55 actuated by a coil spring 55' and formed with differently positioned cam projections 56 for engagement with the lower ends of the corresponding pair of levers 53, each cam plate 55 being slidably mounted beneath a keeper 57 and provided on its inner end with a cam roller 58 adapted for rolling engagement with a suitable form of stepped cam member 59 which is freely journaled upon the extension 26 of the shaft 20 between the hub of the wheel 27 and the crank portion 25 of said shaft. The cam member 59 is provided with three sets of cam surfaces, 61, 62 and 63, one set for each cam roller 58, the said cam surfaces being graduated as to height or distance from the axis of the cam member 59, for the purpose of varying the position of the cam plate 55 and thereby regulating the position of the rollers 43. By reference to Figure 8 it will be noted that when the roller 58 of any one clutch arm 40 is in engagement with either the highest or lowest cam surfaces 61 and 63, one of the clutch rollers 43 will be retracted and the other released into clutching position, the view shown in Figure 8 representing the left hand roller 43 in clutching position, this being the position required for forward driving motion, as indicated by the arrow in said view. In Figure 9, where the roller 58 is shown in engagement with the intermediate cam surface 62, the position of the cam plate 55 is such as to rock both of the levers 53 in a direction for retracting both of the clutch rollers 43 into inoperative or unclutched relation. This is the neutral position of the transmission, while in Figure 10, where the roller 58 is shown in engagement with the lowest cam surface 61, the cam plate 55 assumes a position for causing retraction of the left hand roller 43 and a release of the other roller 43 into clutching position, being that arrangement of the parts required for reversal of the drive, as indicated by the arrow in said Figure 10.

Figure 5:
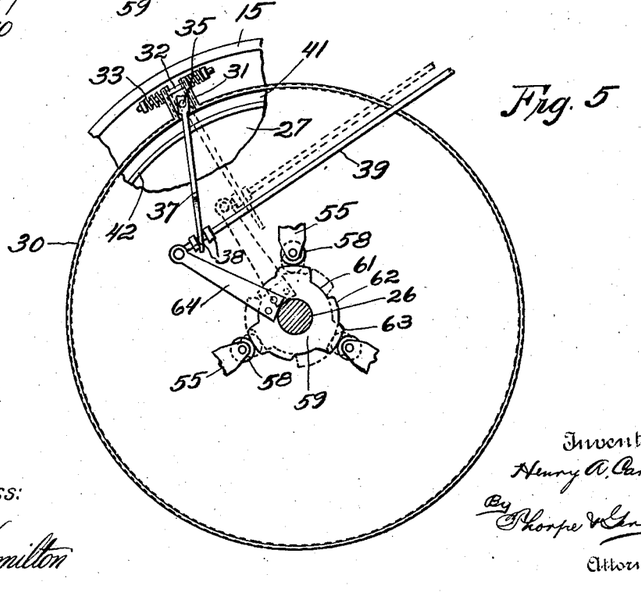
Figure 5 is a detail view showing the brake device, the full lines showing the brake as disengaged, while the broken lines illustrate the brake as applied.

The length of each of the cam surfaces 61, 62 and 63 will be such as to accommodate the travel of the corresponding rollers 58 as required by the length of stroke imparted by the crank portion 25 of the shaft 20 through its connections with the arms 40, as will presently be described. The position of the cam member 59 is conveniently regulated by means of an arm 64 secured to said cam member and having its outer end attached to the inner end of the operating rod 39, as shown in Figures 2, 3 and 5.

Figure 3:
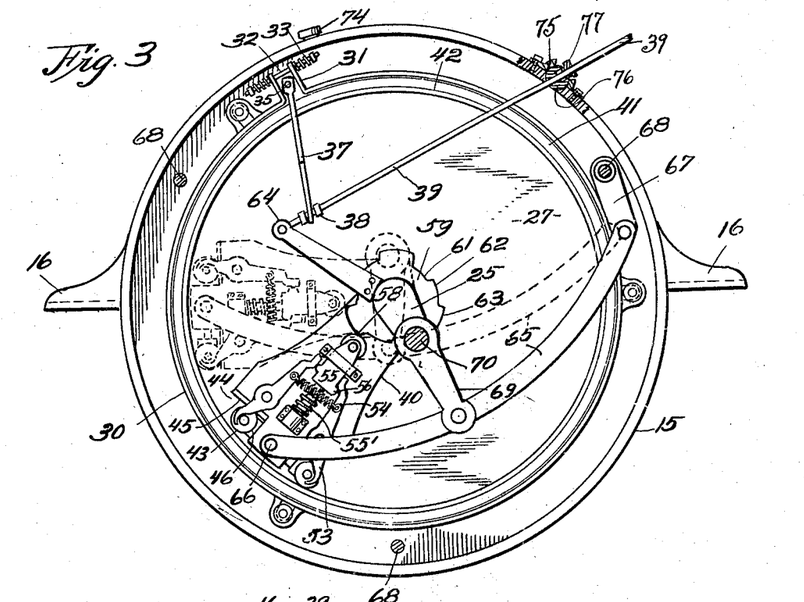
Figure 3 is a similar view, with certain parts omitted, illustrating the approximate amplitude of stroke of one of the oscillating arms whereby the fly wheel is driven, the full lines representing the position of the arm with its clutch elements at the beginning of the stroke, and the broken lines showing its position at the end of its stroke.

Referring now more particularly to Figures 2 to 3, it will be noted that the outer end of each of the clutch arms 40 is provided with a pin 66 having a pivotal connection to one end of a curved lever 65, the other end of which is pivotally connected with a link 67 swively mounted upon a bolt or pin 68 connecting the front and rear walls of the transmission housing 15, as shown in Figure 4. Intermediate its ends each of the levers 65 is pivotally connected with the outer end of an operating link 69, the inner ends of the several links 69 being freely journaled upon the wrist pin portion 70 of the crank 25 of the drive shaft 20. The arrangement of the described connections between the crank 25 and the oscillating clutch arms 40, as exhibited in the drawings, is obviously such as to cause the rotary motion of the crank 25 to effect successive oscillating movements of said clutch arms 40 and in the proper sequence to produce the required intermittent as well as successive clutching actions between the clutch elements of those arms and the clutch ring 42 of the wheel 27.

The simultaneous control of the position of the cam member 59 and the action of the brake band 30 is effected by means of a suitable hand lever 71 connected with the outer end of the rod 39, this lever being provided with a pawl 72 adapted to latch the lever in either neutral, forward or reverse positions with reference to a segment 73, as shown in Figure 14.

Inasmuch as it is proposed to properly lubricate the moving parts of the transmission within the housing 15, by means of a suitable lubricant which may be introduced through the filling passage 74, the opening 75 provided in the housing for the passage of the operating rod 39 is adapted to be maintained sealed or packed by means of a swivel block 76 carried by said rod 39 and provided with a packing gland 77, the swivel block 76 being seated within the opening 75, as shown in Figure 2.

In the operation of the improved construction, it will be understood that with the engine shaft, and consequently the drive shaft 20 (when clutched therewith through the medium of the clutch 21), rotating in the direction of the arrow shown in Figure 2, the crank portion 25 of said shaft 20 will be similarly rotated, and produce the required oscillation of the clutch arms 40 and in such alternating relation as to effect a successive clutching engagement of the clutch elements of those arms with the clutch ring 42 of the driven member 27. One of such oscillating movements of said clutch arms is represented in Figure 3, the full lines showing the initial position of one of the arms 40, with the broken lines in said figure indicating the final position of the arm at the end of its stroke, and the position of the clutch rollers carried by the arm being that required to effect forward motion of the driven wheel. As to the clutch 21, this may or may not be used in connection with the transmission, neither is any other brake required than that shown applied to the driven member 27, which will be found efficient for most purposes, and may be employed as an extra auxiliary or emergency brake in conjunction with the usual hand brake found in automobile construction. The brake band 30 is applied only when the lever 71 is thrown into neutral position, which position this lever is required to assume on passing either from forward to reverse, or vice-versa.

One of the important advantages characterizing the improved transmission is due to the provision of the clutch roller feature between the oscillating arms 40 and the driven member, by virtue of which the movement of the driven member of the transmission may accelerate, if necessary, to any extent above the feed of the driving members, and without being affected or retarded in such accelerating movement by the relatively slower action of the driving members. This will be apparent from an inspection of Figures 2, 3 and 8 to 10 of the drawings, from which it will be readily understood that in the event of any relatively higher speed on the part of the driven member above the rate of movement of the oscillating arms 40 in their operative directions, the only effect will be to produce a releasing or unclutching action of the driving clutch rollers which will have no materially effective action tending to retard the relatively higher rate of movement of the driven member or wheel 27. In other words, the arrangement is such that the load is not tied up with the motive power, so that the latter cannot have any retarding effect upon the momentum of the load whenever the load moves on ahead of the drive, as when the driven wheel 27 attains a speed which is faster than that of the clutch arms 40. By this means it is apparent that a great advantage is secured as regards economy in fuel consumption, since it is evident that the load can coast not only farther but much faster than is possible with the usual form of transmission where the load, on being accelerated above the speed of the engine, cannot continue its movement except in opposition to the engine so long as the transmission is in gear. To illustrate this point, when a car provided with the common type of gear transmission is travelling down hill, the engine exerts a partial braking effect until the momentum of the car overcomes such braking action, whereupon the speed of the engine will be increased in accordance with the increase in speed of the car. This has also the disadvantage of wasting a quantity of the fuel which is drawn into the engine for consumption at a time when the power derived from such fuel is not required. In the present form of transmission, whenever the car speed is faster than that of the engine, the engine's action can have no effect upon the coasting movement of the car, whether the lever 71 is in neutral position or not, so long as this lever is set for operation of the transmission in accordance with the direction in which the car is moving. It will be understood that the speed of the load or car with the improved transmission is regulated ordinarily by the engine throttle, and to further illustrate the point of fuel economy with the improved construction it may be explained that a car going up a given grade at a given speed can accelerate as the grade reduces with the same engine speed, whereas cars provided with the gear form of transmission cannot gain car speed under such circumstances, with the same engine speed, except by shifting the transmission.

It will thus be seen that I have devised a practical, efficient and at the same time comparatively simple transmission construction for carrying out the desired objects of the invention, in which minor changes may be made without departing from the spirit and scope or essential character of my invention. For example, in case a greater length or amplitude of stroke of the clutch arms should be found desirable, requiring a longer throw of the crank, the cam member 59 may readily be provided with cam surfaces displaced into immediately adjacent planes and the rollers 58 positioned in proper operative relation to such cam surfaces, without involving any change whatever in the principle of operation of the improved construction. Accordingly, while I have illustrated and described what I now regard as the preferred form of embodiment of the invention, I wish to reserve the right to make all such changes or modifications as may fairly fall within the scope of the following claims.

What I claim is:

1. A transmission mechanism comprising a drive shaft formed with a crank arm, a driven wheel journaled on said shaft and provided with a peripheral flange, an oscillating clutch arm provided with clutch elements for intermittently gripping said flange, a drive link actuated from said crank arm, and means for pivotally supporting one end of said link, the other end of said drive link being operatively connected with said clutch arm.

2. A transmission mechanism comprising a drive shaft formed with a crank arm, a driven wheel journaled on said shaft and provided with a peripheral flange, an oscillating clutch arm provided with clutch elements for intermittently gripping said flange, and a drive link operatively arranged in a plane at right angles to said shaft and actuated from said crank arm, one end of said drive link being pivotally connected with said clutch arm.

3. A transmission mechanism comprising a drive shaft formed with a crank arm, a driven wheel journaled on said shaft and provided with a peripheral flange, an oscillating clutch arm provided with clutch elements for intermittently gripping said flange, a drive link actuated from said crank arm and provided at one end with a pivotal connection with said clutch arm, and a pivoted supporting link providing a fulcrum for the other end of said drive link.

4. A transmission mechanism comprising a drive shaft formed with a crank arm, a driven wheel journaled on said shaft and provided with a peripheral flange, an oscillating clutch arm provided with clutch elements for intermittently gripping said flange, a drive link having one of its ends pivotally connected with the outer end of said clutch arm, and a pivoted supporting link providing a fulcrum for the other end of said drive link, the intermediate portion of said drive link being operatively connected with said crank arm.

5. A transmission mechanism comprising a driven wheel provided with a peripheral flange, an oscillating clutch arm provided with a pair of clutch elements operative for intermittently gripping said flange for either direction of movement of said arm, means for retracting either or both of said elements into inoperative relation, a drive member provided with connections for oscillating said arm, and a brake member adapted to be automatically engaged with said wheel when both of said clutch elements are retracted into inoperative relation.

6. A transmission mechanism comprising a driven wheel provided with a peripheral flange, a plurality of oscillating clutch arms arranged in different radial positions with reference to the axis of said wheel and each provided with a pair of clutch elements adapted for intermittent gripping engagement with said flange for either direction of movement of said arms, means for selectively positioning said clutch elements into operative relation, and a drive member provided with connections for oscillating said arms successively into gripping engagement with said flange.

7. A transmission mechanism comprising a drive shaft formed with a crank arm, a driven wheel journaled on said shaft and provided with a peripheral flange, a plurality of oscillating clutch arms arranged in different radial positions with reference to said wheel and each provided with clutch elements intermittently gripping said flange, and a drive link forming an operative connection between each of said clutch arms and said crank arm for successively actuating said clutch arms into gripping engagement with said flange.

8. A transmission mechanism comprising a drive shaft formed with a crank arm, a driven wheel journaled on said shaft and provided with a peripheral flange, a plurality of oscillating clutch arms arranged in different radial positions with reference to said wheel and each provided with clutch elements intermittently gripping said flange, and a plurality of drive links operatively arranged in planes at right angles to said shaft and actuated from said crank arm, said drive links having separate pivot connections with said clutch arms and adapted to actuate the latter into successive gripping engagement with said flange.

9. A transmission mechanism comprising a fixed housing, a drive shaft extending axially within said housing, a wheel journaled on said shaft within said housing and provided with a peripheral flange, a plurality of arms oscillating in different radial positions about the axis of said shaft and each provided with clutch elements for intermittent gripping engagement with said flange, a plurality of drive links operatively arranged in planes at right angles to said shaft and actuated from said crank arm, and pivoted fulcrum links conneting one end of each of said drive links to said housing; said drive links having separate pivot connections with said clutch arms and adapted to actuate the latter into successive gripping engagement with said flange.

10. A transmission mechanism comprising a driven wheel provided with a peripheral flange, an oscillating arm provided with a clutch element adapted for intermittent gripping engagement with said flange, a drive shaft provided with a crank portion having connections for oscillating said arm, a cam rotatable about the axis of said drive shaft, and a lever actuated from said cam for retracting said clutch element into inoperative position.

11. A transmission mechanism comprising a driven wheel provided with a peripheral flange, an oscillating arm provided with a spring-actuated clutch element adapted for intermittent gripping engagement with said flange, a lever adapted to retract said clutch element into inoperative position, a drive shaft provided with a crank portion having connections for oscillating said arm, means for holding said lever normally in clutch-releasing position, and a cam rotatable about the axis of said drive shaft and operative to rock said lever into clutch-retracting position.

12. A transmission mechanism comprising a driven wheel provided with a peripheral flange, an oscillating arm provided with a pair of clutch elements adapted for intermittent gripping engagement with said flange and adapted to transmit rotary movement thereto in opposite directions, a drive shaft provided with a crank portion having connections for oscillating said arm, a cam rotatable about the axis of said drive shaft, and a lever actuated from said cam for retracting both of said clutch elements into inoperative position.

13. A transmission mechanism comprising a driven wheel provided with a peripheral flange, an oscillating arm provided with a pair of spring-actuated clutch elements adapted for intermittent gripping engagement with said flange and adapted to transmit rotary movement thereto in opposite directions, means for retracting either or both of said clutch elements into inoperative position, a drive shaft provided with a crank portion having connections for oscillating said arm, and a cam rotatable about the axis of said drive shaft and operative to actuate said retracting means for either separately releasing said clutch elements into operative position or retracting both of said elements into inoperative position.

14. A transmission mechanism comprising a driven wheel provided with a peripheral flange, an oscillating arm provided with a pair of spring-actuated clutch elements adapted for intermittent gripping engagement with said flange and adapted to transmit rotary movement thereto in opposite directions, a lever associated with each of said clutch elements and adapted to retract the same into inoperative position, means for holding said levers normally in clutch-releasing position, a drive shaft provided with a crank portion having connections for oscillating said arm, and a cam rotatable about the axis of said drive shaft and operative to rock said levers for either separately releasing said clutch elements into operative position or simultaneously retracting both of said elements into inoperative position.

15. A transmission mechanism comprising a driven wheel provided with a peripheral flange, an oscillating arm provided with a pair of spring-actuated clutch elements adapted for intermittent gripping engagement with said flange and adapted to transmit rotary movement thereto in opposite directions, a lever associated with each of said clutch elements and adapted to retract the same into inoperative position, a spring connecting said levers and operative to retain the same normally in clutch-releasing position, a drive shaft provided with a crank portion having connections for oscillating said arm, a cam rotatable about the axis of said drive shaft, and a sliding cam element in engagement with both of said levers and actuated from said cam to rock said levers for either separately releasing said clutch elements into operative positions or simultaneously retracting both of said elements into inoperative positions.

16. A transmission mechanism comprising a driven wheel provided with a peripheral flange, an oscillating arm provided with a pair of spring-actuated clutch elements adapted for intermittent gripping engagement with said flange and adapted to transmit rotary movement thereto in opposite directions, a lever associated with each of said clutch elements and adapted to retract the same into inoperative position, a spring connecting said levers and operative to retain the same normally in clutch-releasing position, a drive shaft provided with a crank portion having connections for oscillating said arm, a cam rotatable about the axis of said drive shaft, a sliding cam element in engagement with both of said levers and actuated from said cam to rock said levers for either separately releasing said clutch elements into operative positions or simultaneously retracting both of said elements into inoperative positions, and manually controlled for regulating the position of said cam.

17. A transmission mechanism comprising a driven wheel provided with a peripheral flange, a plurality of oscillating clutch arms arranged in different radial positions with reference to the axis of said wheel, a pair of clutch elements carried by each of said levers for intermittent gripping engagement with said flange for transmitting rotary movement thereto in opposite directions, means for retracting either or both of said clutch elements of each arm into inoperative position, a drive shaft provided with a crank portion having connections for oscillating said arms into successive gripping engagement with said flange, and a cam rotatable about the axis of said shaft and operative to simultaneously actuate the retracting means of said arms for either separately releasing the clutch elements thereof into operative position or simultaneously retracting both clutch elements of each arm into inoperative position.

18. A transmission mechanism comprising a drive shaft, a driven wheel journaled on said shaft, an arm oscillating about the axis of said shaft and provided with a pair of clutch elements for intermittent gripping engagement with said wheel for transmitting rotary movement thereto in opposite directions, said drive shaft being provided with a crank portion having connections for oscillating said arm, and a cam rotatable about the axis of said shaft and operative to retract either or both of said clutch elements into inoperative position.

19. A transmission mechanism comprising a drive shaft, a driven wheel journaled on said shaft, a plurality of arms oscillating in different radial positions about the axis of said shaft, each of said arms being provided with a pair of spring-actuated clutch elements for intermittent gripping engagement with said wheel for transmitting rotary movement thereto in opposite directions, said drive shaft being provided with a crank portion having connections for oscillating said arms into successive gripping engagement with said wheel, and a cam rotatable about the axis of said shaft and operative to either separately retract the clutch elements of said arms into inoperative position or simultaneously retract both clutch elements of each arm into inoperative position.

20. A transmission mechanism comprising a fixed housing, a drive shaft extending axially within said housing, a driven wheel journaled on said shaft within said housing, a plurality of arms oscillating in different radial positions about the axis of said shaft and each provided with a pair of spring-actuated clutch elements for intermittent gripping engagement with said wheel for transmitting rotary movement thereto in opposite directions, said drive shaft being provided with a crank portion, a lever associated with each of said arms and pivotally connected thereto at one end and at its opposite end to said housing, a link connecting each of said levers to said crank portion whereby said levers are oscillated to actuate said arms into successive gripping engagement with said wheel, and a cam rotatable about the axis of said shaft and operative to either separately retract the clutch elements of said arms into inoperative position or simultaneously retract both clutch elements of each arm into inoperative position.

In witness whereof I hereto affix my signature.

HENRY A. CARSON.